March 22, 1960
J. A. STEVENS
2,929,761
GAS TREATMENT DEVICE
Filed May 20, 1957
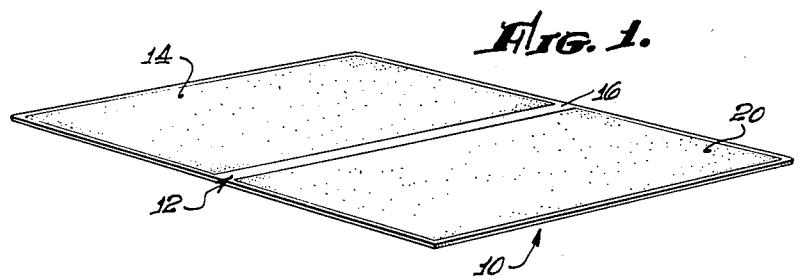
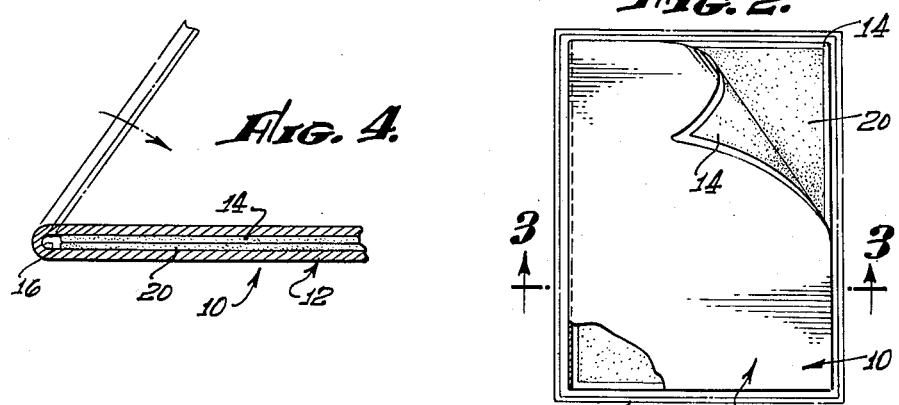
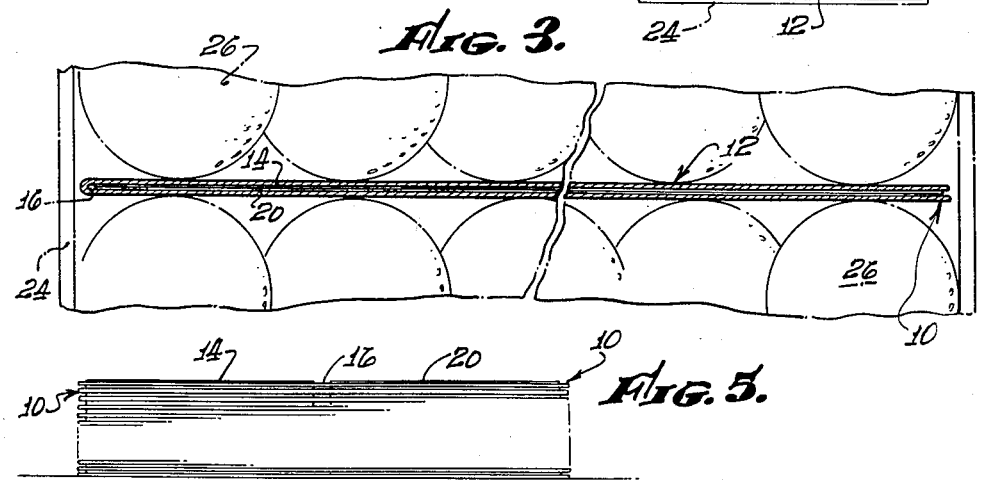
JOHN A. STEVENS,
INVENTOR.
BY Thomas C. Maloney
ATTORNEY.

United States Patent Office 2,929,761
Patented Mar. 22, 1960

2,929,761

GAS TREATMENT DEVICE

John A. Stevens, Fullerton, Calif., assignor to Paper Products, Incorporated, Long Beach, Calif., a corporation of California Application May 20, 1957, Serial No. 660,182

5 Claims. (Cl. 167—39)

This invention relates to a gas treatment device and, more particularly, to a gas treatment device adapted to be utilized in treating articles during the transportation thereof to retard or prevent damage to said articles.

The gas treatment device of my invention is particularly adapted for utilization in treating fruit, vegetables, and other perishable commodities which must be shipped long distances under conditions which are particularly conducive to the generation of molds and other undesirable fungus growths upon said fruits or vegetables. For instance, oranges are shipped in refrigerator cars in a moist atmosphere which is conducive to the growth of blue mold on the oranges and which thus results in damage to the gruit preventing the marketing thereof.

It has been discovered that if the oranges can be subjected during transit to a sufficient quantity of ammonia gas ($NH_3$) for a sufficiently prolonged period, the growth of blue mold on the oranges will be prevented. However, considerable difficulty has been encountered in finding a satisfactory source of ammonia which will emit the gas in desired quantities for a sufficiently long period of time without damage to the fruit.

Illustrative of this difficulty is the fact that attempts have been made to utilize ammonia gas emissive pellets which have been deposited in the shipment containers for the oranges and which have emitted ammonia during the transportation of the fruit in said containers. However, it has been discovered that the localized emission of ammonia from the pellets has resulted in burning of the fruit immediately contiguous to the gas emissive pellets and in the inadequate treatment of the fruit most remote from said pellets.

Another disadvantages of such pellets has been the fact that when subjected to a moist atmosphere in storage or transportation the pellets tend to initiate their gas emissive function and are frequently completely depleted prior to the time at which they are to be inserted in a container for the shipment of the fruit. While I disclose my invention as utilized in the treatment of oranges during the transportation thereof by the emission of ammonia, it is, of course, not intended that the teachings of the invention be limited to the particular application or to the particular gas emitted therefrom since it is obvious that my invention can be applied with equal facility to other products and can be utilized to emit different types of gasses and other substances.

It is, therefore, an object of my invention to provide a gas emitting device which includes a flexible backing sheet formed from paper, fabric, cloth, or other material and which has one area on one side treated with a first substance and which has the same side treated in a second area spaced from the first area with a second substance adapted to react chemically with the first substance.

For instance, in the particular application referred to hereinabove, the first substance applied to the first area of the backing sheet consists of thirty grams of K solution sodium silicate, and the second area of the same side of the sheet is coated with a paste incorporating ammonium chloride in proportions which will be set forth hereinbelow in greater detail.

By the provision of the first and second substances on the spaced areas on the same side of the sheet, said substances are unable to react with each other during storage and remain substantially inert even when exposed to moist conditions which will cause the hygroscopic characteristics of the sodium silicate to be evidenced.

Furthermore, the gas treatment devices can be shipped in large numbers with the coated surface juxtaposed to the uncoated surface of an adjacent device, thus isolating the coated surfaces from one another and preventing their reaction from occurring between adjacent coated surfaces of the devices.

In addition, the provision of a relatively large backing sheet for the treatment device distributes the gas emissive chemicals over a relatively large area within the container for the fruits, as will be described in greater detail hereinbelow and, therefore, there is an equal distribution of the gas. In addition, the manner in which the gas treatment device of my invention is utilized prevents the fruit adjacent the device from being burned or otherwise contaminated during the emission of the ammonia therefrom.

Other objects and advantages of my invention will be apparent from the following specification and the accompanying drawing which is for the purpose of illustration only and in which:

Fig. 1 is a perspective view showing a gas treatment device constructed in accordance with the teachings of my invention;

Fig. 2 is a top plan view showing the gas treatment device installed in a shipment container;

Fig. 3 is a transverse, sectional view taken on the broken line 3—3 showing the manner in which the gas treatment device of my invention may be located among the fruit or other commodity in a shipment container;

Fig. 4 illustrates the manner in which the gas treatment device of my invention is folded to bring the chemical substances in the separate areas thereupon into contact with each other; and Fig. 5 is a side elevational view showing the manner in which the gas treatment devices may be stacked, one upon the other, for shipment or storage without the possibility of any premature chemical reaction taking place.

Referring to the drawing and particularly to Fig. 1 thereof, I show a gas treatment device 10 constructed in accordance with the teachings of my invention and including a backing sheet 12 formed from twenty-five pound kraft paper, or the like. While I disclose the backing sheet 12 as fabricated from kraft paper of a particular weight, it is, of course, not intended that the invention be limited to the utilization of specific type of paper since it is obvious to those skilled in the art that various weights and different types of papers may be used as a backing sheet. Moreover, if desired, backing sheets formed from cloth or from such synthetic materials as cellophane may be used provided that the structure thereof is sufficiently dense to support the chemical substances to be applied to one surface or side thereof, in a manner to be described in greater detail below.

In the present embodiment of my invention, the backing sheet 12 is in the shape of a rectangle 16 by 20 inches, although there is obviously no particular limitation on either configuration or size of the backing sheet, these elements depending entirely upon the size of the container and the amount of treating gas which it is intended should be emitted during the utilization of the gas treatment device. Furthermore, it is conceivable that the individual backing sheets 12 constitute a part of a continuous web of paper or other material and that the sheets be severed therefrom only after the coating process described hereinbelow has taken place.

In any event, the individual backing sheets 12 have a first area 14 on one surface 16 thereof coated with between twenty and thirty grams of K solution sodium silicate, the first area being approximately 9½ x 16 inches in dimension. This amount of sodium silicate is equal to approximately four to six grams of sodium carbonate, but can be more effectively applied to the first area 14 on the one surface of the backing sheet 12 than the sodium carbonate.

A second area 20 is then coated with a paste consisting of three parts water ($H_2O$), one-half part tapioca flour, and one and one-half parts of ammonium chloride ($NH_4Cl$) or, quantitatively, consisting of three ounces of water, one-half ounce of tapioca flour, and one and one-half ounces of $NH_4Cl$. The five ounce total is sufficient to coat six areas 9½ x 16 inches in dimension. Thus, approximately three-quarters of an ounce of the resulting paste is applied to each of the second areas 20 on the one surface 16 of the backing sheet 12.

It will be noted that a space of approximately one-quarter of an inch is provided between the opposed edges of the first and second areas 14 and 20 to prevent the chemical reaction between the substances on said areas from taking place until the gas treatment device has been installed in a shipping container of fruit, in a manner to be described in greater detail below.

It is, of course, to be understood that other chemicals capable of emitting ammonia may be utilized in substitution for the chemicals described hereinabove as applied to the respective areas of the backing sheet. For instance, sodium carbonate ($Na_2CO_3$) can be applied to the first area 14 in substitution for the sodium silicate which is applied thereto in the preferred embodiment of the invention, and a paste incorporating ammonium sulfate ($NH_42SO$) may be substituted for the ammonium chloride paste described hereinabove. For instance, a mix consisting of seven grams of ammonium sulfate dispersed in a sufficient quantity of Dextrine paste, or any paste or glue, to bind it to the surface can be utilized. This amount is sufficient to disperse two grams of free ammonia in a thirty pound carton of oranges when combined with the sodium silicate in the presence of moisture.

Moreover, if the emission of a gas other than ammonia is desired, suitable chemicals which will react with each other when brought into contact with each other can be applied to the first and second areas of the one surface of the backing sheet 12.

The application of the sodium silicate and the ammonium chloride paste can be accomplished by the utilization of conventional coating machines which will meter the requisite amounts of the sodium silicate and ammonium chloride paste to the spaced areas 14 and 20 on a continuous web from which the individual backing sheets 12 can ultimately be cut to constitute the individual gas treating devices 10. After fabrication in the above described or analogous manners well known to those skilled in the art, the gas treatment devices can be stored by superimposing them, one on top of the other, in the manner illustrated in Fig. 5 of the drawing with the uncoated surface of the superimposed device juxtaposed to the coated surface thereof.

Thus, the coated areas on the one surface of each of the devices are isolated from contact with the coated surfaces and areas on an adjacent device.

In utilizing the gas treatment devices 10 of my invention, a stack of said devices, similar to that shown in Fig. 5 of the drawing, is placed at a position in a fruit packing line where the shipping containers 24 are packed with oranges 26 and, as best illustrated in Figs. 2–4 of the drawing, the backing sheet 12 is folded to bring the first and second areas 14 and 20 into engagement with each other. The folded gas treatment device 10 is then located in the shipping container 24 at a point intermediate the height of the shipping container and between the oranges 26 or other fruit in the container, as best illustrated in Fig. 3.

The efficacy of the gas treatment device 10 and the reasons therefor become apparent when it is considered that the gas treatment device 10 is sufficiently large to distribute the ammonia equally throughout the shipping container 24. Moreover, the oranges themselves are only in contact with the uncoated surface of the backing sheet 12 and thus the possibility of burning or otherwise injuring the oranges 26 is eliminated.

After the oranges 26 have been packed in the shipping container 24 with the gas treatment device 10 located in the position shown in Fig. 3 of the drawing, the shipping containers 24 are packed in a refrigerator car characterized by a moist atmosphere conducive to the growth of blue mold and other fungus. Under such moist atmosphere conditions, the hygroscopic sodium silicate picks up moisture and the gas emission process is initiated by the chemical reaction between the sodium carbonate in the sodium silicate and the ammonium chloride in the paste on the respective first and second areas 14 and 20. By actual test, I have found that this gas emission continues for a period of approximately forty hours during which time approximately two grams of ammonia ($NH_3$) are emitted and equally distributed throughout the container 24 to prevent the growth of blue mold upon the outer surfaces of the oranges 26.

I thus provide by my invention a gas treatment device of extreme simplicity which can be stored for prolonged lengths of time without diminishing the ultimate effectiveness thereof when it is finally utilized in an appropriate environment. Moreover, because of the nature of the device, the chemical substances utilized to emit the gas are isolated from direct contact with the fruit being treated and, furthermore, the gas emitted thereby is more evenly distributed for a greater length of time than by prior art methods.

The gas treatment method of my invention thus includes the steps of applying the chemical substances to the backing sheet in the prescribed areas, bringing the chemical substances into contact with each other by folding the sheet and ultimately packing the folded sheet in juxtaposition to the fruit to be treated and, in turn, locating the packed fruit in an atmosphere characterized by the presence of excess amounts of moisture.

I claim as my invention:

1. In a device for emitting a treating gas, the combination of: a flexible backing sheet; a first area on one side of said sheet coated with a first substance; and a second area on said one side of said sheet spaced from but aligned with said first area coated with a second substance adapted to chemically react in a moist atmosphere with said first substance when said sheet is folded to bring said areas into contact with each other whereby the reaction of said first and second substances results in the emission of a treating gas.

2. In a gas treating device, the combination of: a flexible backing sheet; a first area on one side of said sheet coated with a first substance; and a second area on said one side of said sheet spaced from said first area and coated with a second substance adapted to chemically react in a moist atmosphere with said first substance when said sheet is folded to bring said areas into contact with each other and produce a treating gas.

3. In a device for emitting a treating gas, the combination of: a paper backing sheet; a first area on one side of said sheet coated with a first substance; and a second area on said one side of said sheet spaced from but aligned with said first area coated with a second substance adapted to chemically react in a moist atmosphere with said first substance when said sheet is folded to bring said areas into contact with each other whereby the reaction of said first and second substances results in the emission of a treating gas.

4. In a gas treating device, the combination of: a paper backing sheet; a first area on one side of said sheet coated with a first substance; and a second area on said one side of said sheet spaced from said first area and coated with a second substance adapted to chemically react in a moist atmosphere with said first substance when said sheet is folded to bring said areas into contact with each other and produce a treating gas.

5. In a device for emitting a treating gas, the combination of: a flexible backing sheet; a first area on one side of said sheet coated with sodium silicate; and a second area on said one side of said sheet spaced from but aligned with said first area coated with a mixture of three parts water, one-half part tapioca, and one and one-half parts ammonium chloride adapted to chemically react in a moist atmosphere with said first substances when said sheet is folded to bring said areas into contact with each other.

References Cited in the file of this patent

UNITED STATES PATENTS

| | | |
|---|---|---|
| 2,185,954 | Ryner | Jan. 2, 1940 |
| 2,299,693 | Green | Oct. 20, 1942 |
| 2,431,470 | Faukes | Nov. 25, 1947 |
| 2,465,470 | Omohundro et al. | Mar. 29, 1949 |
| 2,755,188 | Keller | July 17, 1956 |
| 2,821,500 | Jackson et al. | Jan. 28, 1958 |
| 2,828,210 | Keller | Mar. 25, 1958 |
| 2,883,322 | Whipple | Apr. 21, 1959 |

FOREIGN PATENTS

| | | |
|---|---|---|
| 399,173 | Great Britain | Sept. 25, 1933 |
| 517,079 | Great Britain | Jan. 19, 1940 |